US008738481B2

(12) United States Patent
Kondo

(10) Patent No.: US 8,738,481 B2
(45) Date of Patent: May 27, 2014

(54) REMOTE MANAGEMENT SYSTEM

(75) Inventor: Mayu Kondo, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 432 days.

(21) Appl. No.: 12/403,554

(22) Filed: Mar. 13, 2009

(65) Prior Publication Data

US 2009/0234762 A1 Sep. 17, 2009

(30) Foreign Application Priority Data

Mar. 17, 2008 (JP) ................................ 2008-068431

(51) Int. Cl.
*G07F 19/00* (2006.01)
(52) U.S. Cl.
USPC ................... 705/34; 705/30; 705/32; 705/33
(58) Field of Classification Search
None
See application file for complete search history.

(56) References Cited

U.S. PATENT DOCUMENTS

| | | | | |
|---|---|---|---|---|
| 6,006,045 A | * | 12/1999 | Miyawaki | 399/8 |
| 6,775,729 B1 | * | 8/2004 | Matsuo et al. | 710/263 |
| 7,011,462 B2 | * | 3/2006 | Hanaoka | 400/76 |
| 7,061,634 B1 | * | 6/2006 | Ogura et al. | 358/1.15 |
| 7,620,557 B2 | * | 11/2009 | Nakamatsu et al. | 705/1.1 |
| 2004/0148379 A1 | * | 7/2004 | Ogura | 709/223 |

FOREIGN PATENT DOCUMENTS

| | | |
|---|---|---|
| JP | 2004-110634 | 4/2004 |
| JP | 2007-79484 | 3/2007 |

OTHER PUBLICATIONS

Office Action issued Jun. 5, 2012, in Japanese patent Application No. 2008-068431.

* cited by examiner

*Primary Examiner* — Fateh Obaid
(74) *Attorney, Agent, or Firm* — Oblon, Spivak, McClelland, Maier & Neustadt, L.L.P.

(57) ABSTRACT

A remote management system includes imaging apparatuses and a central managing apparatus configured to manage the imaging apparatuses. The imaging apparatuses and the central managing apparatus are connected to mutually communicate with each other. The respective imaging apparatuses notify the central managing apparatus of one or more counter values of one or more users, one of the counter values corresponds to a number of images processed by corresponding one of the users by using one of the imaging apparatuses. The central managing apparatus determines a fee to be charged to one of the users according to a total counter value of the one of the users. The total counter value is a sum of the counter values of the one of the users notified by the imaging apparatuses.

14 Claims, 15 Drawing Sheets

FIG.4

| COUNTER VALUE | PRICE PER SHEET |
|---|---|
| 1-999 SHEETS | 10 YEN |
| 1000-1999 SHEETS | 8.5 YEN |
| 2000 SHEETS OR MORE | 7 YEN |

FIG.5

|  | IMAGING APPARATUS A | IMAGING APPARATUS C | TOTAL NUMBER OF PRINTED SHEETS PER USER |
|---|---|---|---|
| USER M | 900 | 0 | 900 |
| USER N | 200 | 2200 | 2400 |
| TOTAL NUMBER OF PRINTED SHEETS PER IMAGING APPARATUS | 1100 | 2200 | 3300 |

FIG.6

| | NUMBER OF PRINTED SHEETS | PRICE PER COUNT | TOTAL FEE |
|---|---|---|---|
| USER M | 900 | 8.5 | 7650 |
| USER N | 200 | 8.5 | 1700 |
| TOTAL NUMBER OF PRINTED SHEETS OF IMAGING APPARATUS A | 1100 | 8.5 | 9350 |

FIG.7

| | NUMBER OF PRINTED SHEETS | PRICE PER COUNT | TOTAL FEE |
|---|---|---|---|
| USER M | 0 | 7 | 0 |
| USER N | 2200 | 7 | 15400 |
| TOTAL NUMBER OF PRINTED SHEETS OF IMAGING APPARATUS C | 2200 | 7 | 15400 |

FIG.8

| | IMAGING APPARATUS A | IMAGING APPARATUS C | TOTAL FEE PER USER |
|---|---|---|---|
| USER M | 7650 | 0 | 7650 |
| USER N | 1700 | 15400 | 17100 |
| TOTAL FEE PER IMAGING APPARATUS | 9350 | 15400 | 24750 |

FIG.9

| | TOTAL NUMBER OF PRINTED SHEETS PER USER | PRICE PER COUNT | FEE PER USER | PERCENTAGE |
|---|---|---|---|---|
| USER M | 900 | 10 | 9000 | 34.88% |
| USER N | 2400 | 7 | 16800 | 65.12% |
| | | | 25800 | |

FIG.10

| | TOTAL CHARGED FEE | PERCENTAGE | CHARGED FEE PER USER |
|---|---|---|---|
| USER M | 24750 | 34.88% | 8633.72093 |
| USER N | 24750 | 65.12% | 16116.27907 |
| TOTAL CHARGED FEE OF IMAGING APPARATUSES | | | 24750 |

FIG.12

| | IMAGING APPARATUS A | IMAGING APPARATUS B | TOTAL NUMBER OF PRINTED SHEETS PER USER |
|---|---|---|---|
| USER M | 900 | 300 | 1200 |
| USER N | 200 | 1200 | 1400 |
| TOTAL NUMBER OF PRINTED SHEETS PER IMAGING APPARATUS | 1100 | 1500 | 2600 |

FIG.13

| | NUMBER OF PRINTED SHEETS | PRICE PER COUNT | TOTAL FEE |
|---|---|---|---|
| USER M | 300 | 8.5 | 2550 |
| USER N | 1200 | 8.5 | 10200 |
| TOTAL NUMBER OF PRINTED SHEETS OF IMAGING APPARATUS B | 1500 | 8.5 | 12750 |

FIG.14

| | IMAGING APPARATUS A | IMAGING APPARATUS B | CHARGED FEE PER USER |
|---|---|---|---|
| USER M | 7650 | 2550 | 10200 |
| USER N | 1700 | 10200 | 11900 |
| TOTAL FEE PER IMAGING APPARATUS | 9350 | 12750 | 22100 |

FIG.15

| | IMAGING APPARATUS A + IMAGING APPARATUS B | PRICE PER COUNT | CHARGED FEE PER USER |
|---|---|---|---|
| USER M | 10200 | 7 | 8400 |
| USER N | 11900 | 7 | 9800 |
| TOTAL FEE PER IMAGING APPARATUS | 22100 | 7 | 18200 |

REMOTE MANAGEMENT SYSTEM

BACKGROUND OF THE INVENTION

1. Field of the Invention

The present invention generally relates to a remote management system and a remote management method of an imaging apparatus such as a multifunction peripheral, and more specifically, to a remote managing system and a remote management method that are favorably used for charging each user according to the number of sheets that the user used in the imaging apparatus.

2. Description of the Related Art

As a conventional technique for charging a user for the usage of an imaging apparatus, there has been known a technique to sign up for a maintenance service contract of the imaging apparatus, determine a price of one count according to a counter value indicating the number of processed sheets, and determine a maintenance price per month based on the price of one count. Further, there is also known a counter for each user, for managing the number of sheets processed by each user who is registered in the apparatus.

Moreover, for example, a technique disclosed in Patent Document 1 and the like has been known as another conventional technique. This conventional technique relates to a charging method and a price determining apparatus of an image forming apparatus. The object of this conventional technique is to charge the fee of used toner fairly and easily, by using dot coverage data.

Patent Document 1: Japanese Patent Application Publication No. 2007-79484

The above conventional techniques, however, all have a problem in that it is difficult to charge different fees to individual users when plural users use one apparatus in an office and the like.

Further, by the above-described maintenance service contract, when more sheets are printed, the price of one count becomes lower. However, when only one of the users prints many sheets, the users are charged a fee calculated by multiplying the price per count with a counter value of the respective user. Therefore, the charged fee is unfair for some users.

The price per count is determined according to the number of printed sheets of each apparatus. Therefore, in particular, when the same user who uses plural apparatuses prints a few sheets by each apparatus but many sheets in total by the apparatuses, the user is considered to be using each apparatus with a low frequency. Thus, the user is charged a high fee.

Furthermore, when there are plural apparatuses of the same type and one of them is used especially frequently, a price per count is low in that apparatus since the number of printed sheets is large. However, when one apparatus is especially frequently used, its components are more worn and torn.

SUMMARY OF THE INVENTION

It is an object of at least one embodiment of the invention to provide a remote management system and a remote management method, by which the number of prints per user and the number of prints per imaging apparatus are both taken into account to charge a user by using a user counter, when determining a fee to be charged to each user in an environment where the same user uses plural imaging apparatuses.

According to one aspect of the present invention, a remote management system includes imaging apparatuses and a central managing apparatus configured to manage the imaging apparatuses. The imaging apparatuses and the central managing apparatus are connected to mutually communicate with each other. The respective imaging apparatuses notify the central managing apparatus of one or more counter values of one or more users, in which one of said counter values corresponds to a number of images processed by corresponding one of said users by using one of the imaging apparatuses. The central managing apparatus determines a fee to be charged to one of said users according to a total counter value of said one of the users. The total counter value is a sum of the counter values of said one of the users notified by the imaging apparatuses.

According to another aspect of the present invention, a remote management method to remotely manage plural imaging apparatuses which are connected to a central managing apparatus managing the imaging apparatuses to mutually communicate with each other includes the steps of notifying the central managing apparatus of one or more counter values of one or more users by the respective imaging apparatuses, in which one of said one or more counter values corresponds to a number of images processed by one of said one or more users by using one of the imaging apparatuses; and determining a fee to be charged to one of said users by the central managing apparatus according to a total counter value of said one of the users. The total counter value is a sum of the counter values of said one of the users notified by the imaging apparatuses.

BRIEF DESCRIPTION OF THE DRAWINGS

FIG. 4 is a diagram showing an example of a price system of a maintenance service contract for charging a fee in an embodiment of the present invention;

FIG. 5 is a diagram showing an example of the numbers of sheets that users M and N printed by imaging apparatuses A and C shown in FIG. 1;

FIG. 6 is a diagram showing charged fees of respective users of the imaging apparatus A;

FIG. 7 is a diagram showing charged fees of respective users of the imaging apparatus C;

FIG. 8 is a diagram showing total charged fees of respective users obtained by the charged fees of the respective imaging apparatuses and respective users obtained as shown in FIGS. 6 and 7;

FIG. 9 is a diagram showing usage rates of the respective users, which are obtained by the total number of printed sheets and the price per sheet of the respective users;

FIG. 10 is a diagram showing fees to be charged to respective users, which are obtained by the percentages of the respective users and the total fee shown in FIG. 8;

FIG. 12 is a diagram showing an example of the number of sheets that the users M and N printed by the imaging apparatuses A and B shown in FIG. 1;

FIG. 13 is a diagram showing fees charged to the respective users in the imaging apparatus B;

FIG. 14 is a diagram showing total fees charged to the respective users, which are obtained by the charged fees of the respective imaging apparatuses and respective users, obtained as shown in FIGS. 6 and 13; and FIG. 15 is a diagram showing an example of the case to determine the charged fees of the respective users by the total number of sheets printed by the imaging apparatuses A and B.

DETAILED DESCRIPTION OF THE PREFERRED EMBODIMENTS

Hereinafter, an embodiment of a remote management system and a remote management method of the present invention is described in detail with reference to the drawings.

Figure 1:
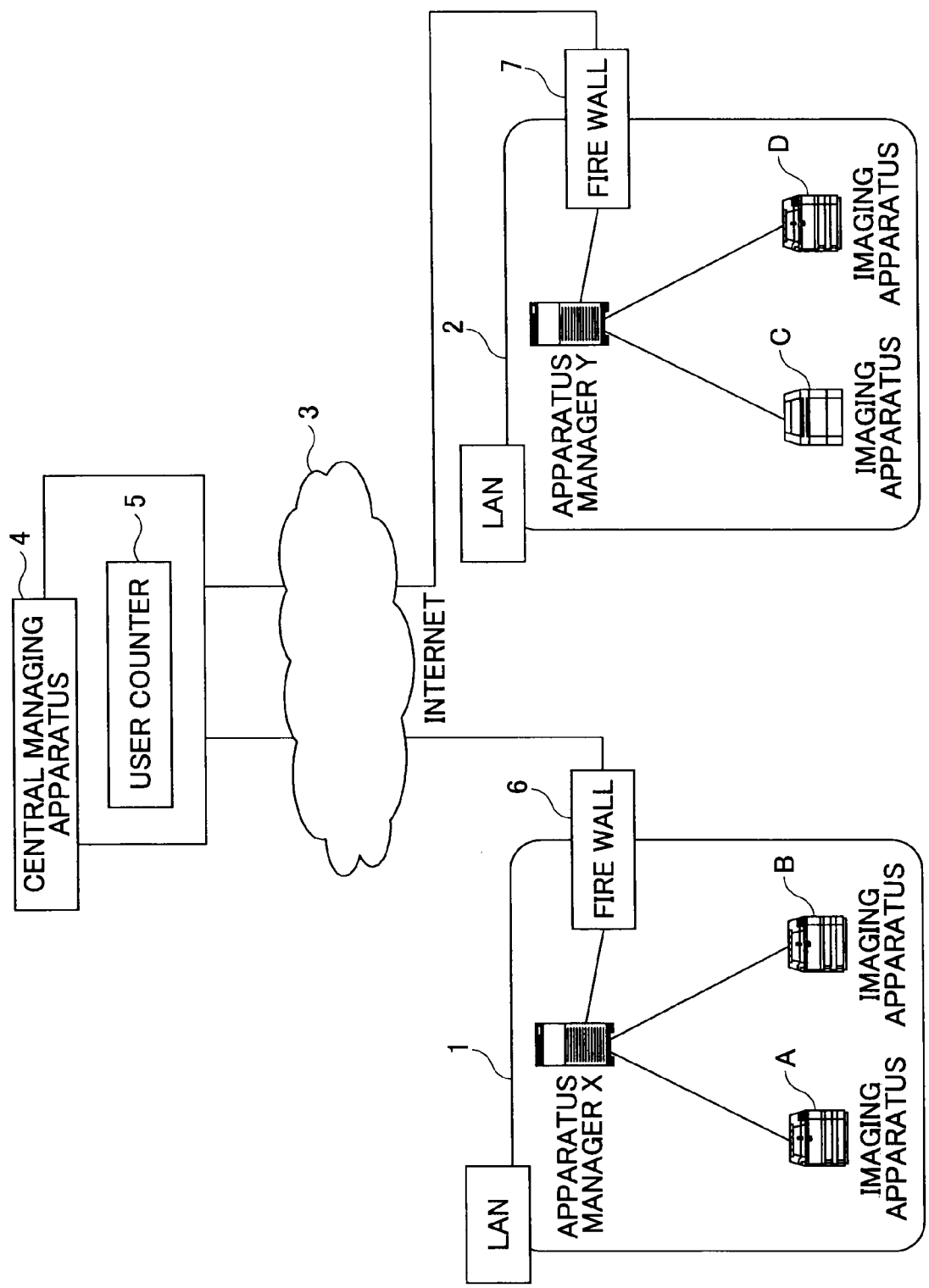
FIG. 1 is a block diagram showing a configuration of a remote management system of an embodiment of the present invention.

FIG. 1 is a block diagram showing a configuration of a remote management system of the embodiment of the present invention.

As shown in FIG. 1, the remote management system of the embodiment of the present invention includes a LAN (Local Area Network) 1 connecting plural imaging apparatuses A and B and an apparatus manager X, and a LAN 2 connecting plural imaging apparatuses C and D and an apparatus manager Y. The LAN 1 and LAN 2 are connected via fire walls 6 and 7 to a central managing apparatus 4 through a communication line 3 such as the Internet.

The imaging apparatuses A to D may be image forming apparatuses such as copiers, printers, FAX machines, and multifunction peripherals having functions of these machines. The apparatus managers X and Y are information processing apparatuses represented by PCs and the like. Each of the apparatus managers X and Y has a function to collect counter values each indicating the number of used sheets per user from the imaging apparatuses connected in the same LAN. The apparatus managers X and Y include a memory, a CPU (Central Processing Unit), a communication function with the imaging apparatuses, and the like.

The central managing apparatus 4 is an information processing apparatus represented by a server and the like. The central managing apparatus 4 includes a recording device such as a memory and a HDD (Hard Disk Drive), a CPU, and a communication function with the apparatus managers. The central managing apparatus 4 also includes a user counter 5 for obtaining counter values indicating the numbers of used sheets per user, which are collected by the apparatus managers X and Y, and storing the counter values for each user.

In the above example, two imaging apparatuses are connected in one LAN, however, more imaging apparatuses may be connected in one LAN. Moreover, although one apparatus manager is provided in one LAN in the example shown in FIG. 1, the apparatus manager may be integrated in the imaging apparatus. Further, although one central managing apparatus 4 is connected to the two LANs 1 and 2, one central managing apparatus 4 may be connected to only one LAN, or plural LANs.

Figure 2:
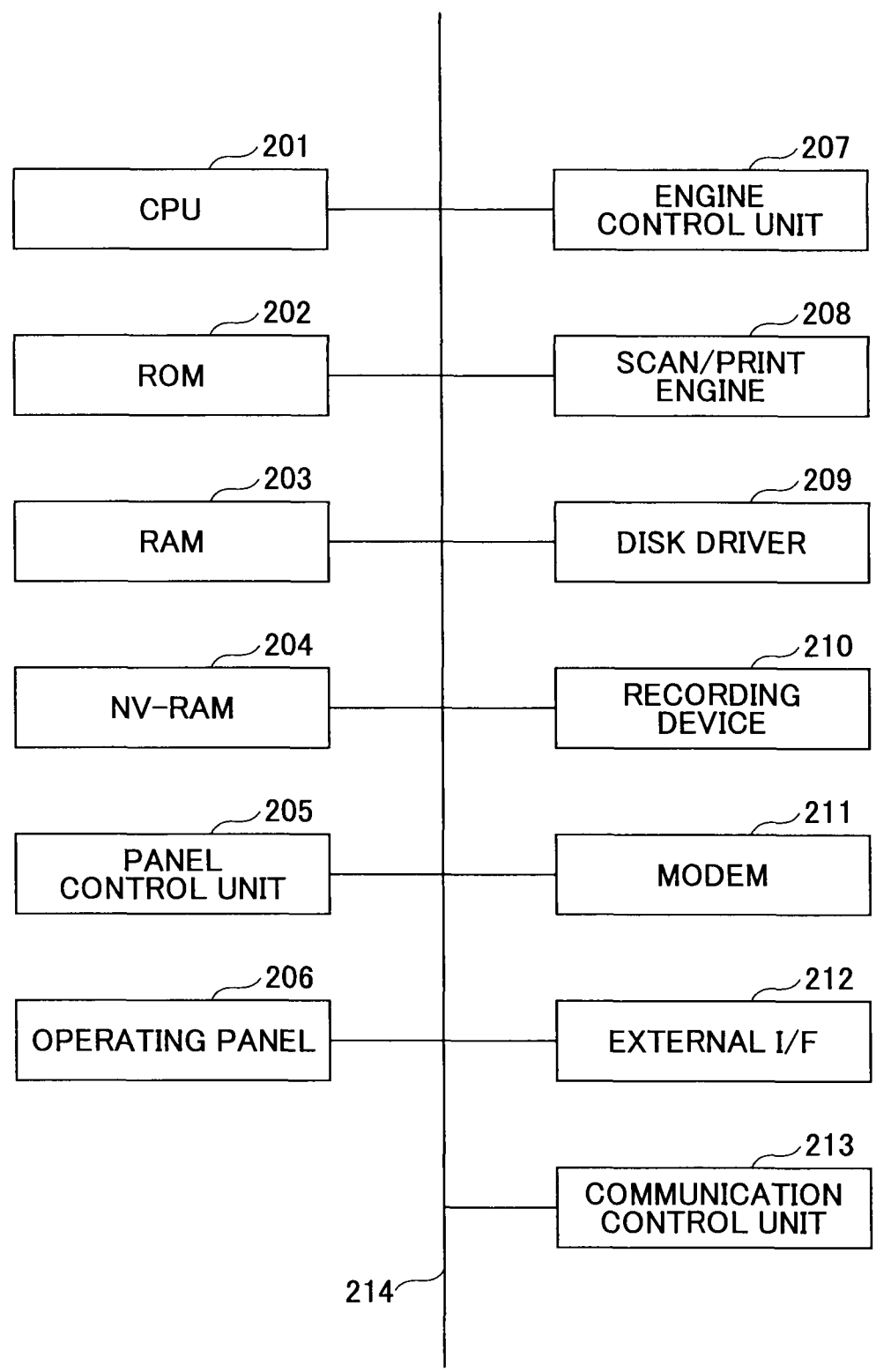
FIG. 2 is a diagram showing an example of a configuration of functions of an image forming apparatus as an imaging apparatus.

FIG. 2 is a diagram showing an example of a configuration of functions of an image forming apparatus serving as an imaging apparatus. Now, this example is described below. A general function, operation, and the like of the image forming apparatus are not described here, however, it is an essential feature that the imaging apparatus of the embodiment of the present invention obtains and holds a user name and a counter value indicating the number of sheets used by the user when the imaging apparatus is used. Therefore, data of a user who can use the imaging apparatus are registered in advance in the imaging apparatus. A method to input user data into the imaging apparatus and a method to uniquely manage the user data are not described here.

As shown in FIG. 2, the image forming apparatus includes a CPU 201, a ROM (Read Only Memory) 202, a RAM (Random Access Memory) 203, a NV-RAM 204, a panel control unit 205, an operating panel 206, an engine control unit 207, a scan/print engine 208, a disk driver 209, a recording device 210, a modem 211, an external I/F 212, and a communication control unit 213. These components are connected through a data bus 214. The CPU 201 controls the above-described components.

The ROM 202 stores program code, a font, and other static data. The RAM 203 functions as a work memory of the CPU 201 and is used as a temporary recording area. The NV-RAM 204 stores data that require nonvolatility. The panel control unit 205 and the operating panel 206 serve as an interface with a user. The control unit 207 and the scan/print engine 208 serve as units for inputting and outputting image data, to read a paper document and print the data onto a transfer sheet. The disk driver 209 and the recording device 210 such as a hard disk accumulate a large volume of image data and the like, and store them in a database. The communication control unit 213 is connected to a network such as Ethernet (registered trademark) and enables communication with an external apparatus. The modem 211, which is connected to a public network, is used for the communications with an external apparatus. In the embodiment of the present invention, the modem 211 is used for communications with the central managing apparatus 4 through the Internet 4. The external I/F 212 is used for communications using an interface such as a Centronics interface and RS232. The data bus 214 is used for the mutual communications among the above-described components, and communication between the CPU 201 and the above-described components.

Figure 3:
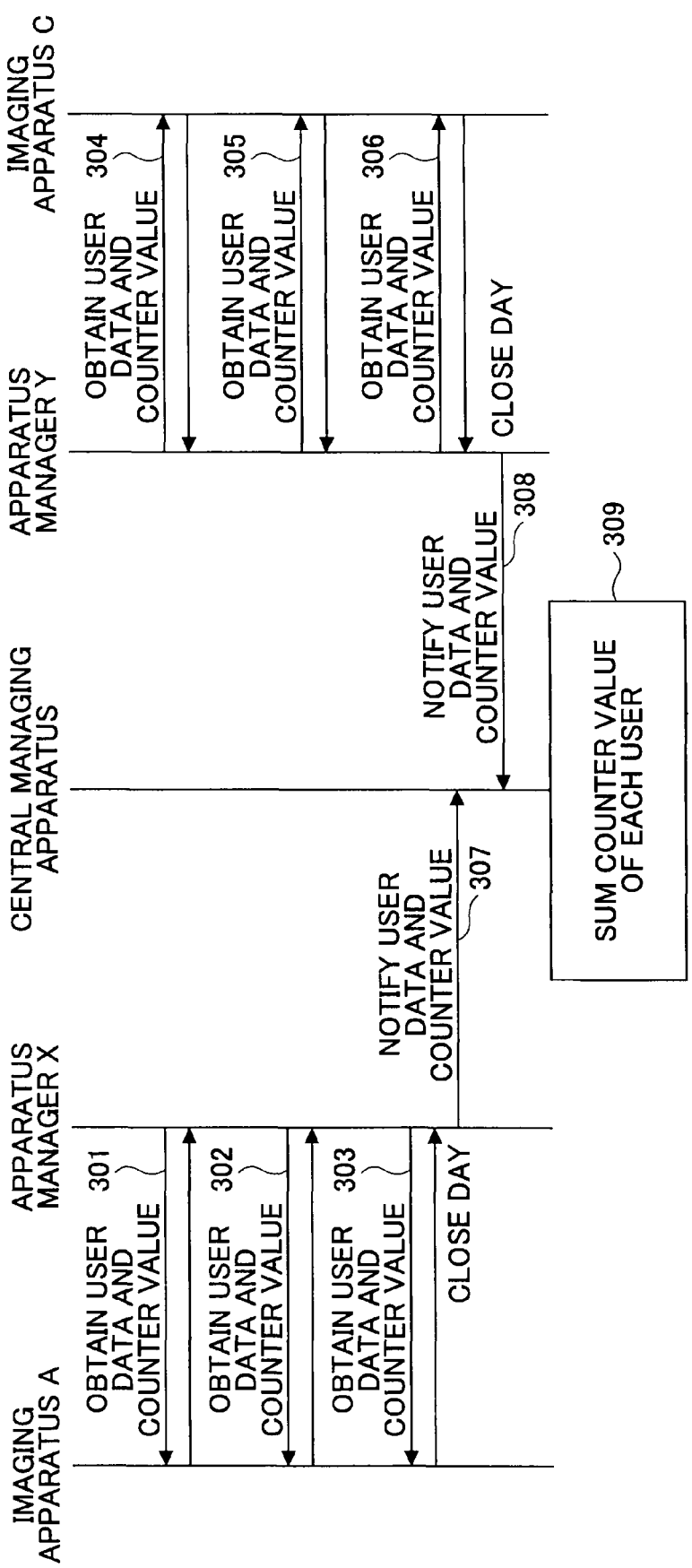
FIG. 3 is a sequence chart for describing an operation in which a central managing apparatus obtains counter values from imaging apparatuses.

FIG. 3 is a sequence chart for describing an example of an operation of the central managing apparatus which obtains counter values from the imaging apparatuses. Next, this operation is described. In the example shown in FIG. 3, the central managing apparatus obtains counter values of respective users from the imaging apparatuses A and C in the system shown in FIG. 1. The operation is similar to this in the case where counter values of respective users are obtained from the imaging apparatuses B and D. Although not shown in FIG. 3, when the imaging apparatuses A and C are used, each of the imaging apparatuses A and C obtains a user name and a counter value indicating the number of sheets used by the user, and holds the user data and the counter value which is added for each user according to the use by each user. After the results of the counter values added for each user are sent to the apparatus manager by a process described below, the counter values held in the imaging apparatuses A and C are reset to zero.

(1) With a frequency of once or more in a few hours, the apparatus manager X obtains a counter value and user data of the imaging apparatus A in the LAN 1 to which the apparatus manager X is connected, adds up the counter value of each user, and records the counter value and the user data in a memory of the apparatus manager X (steps 301 to 303).

(2) In a similar manner, with a frequency of once or more in a few hours, the apparatus manager Y obtains a counter value and user data of the imaging apparatus C in the LAN 2 to which the apparatus manager Y is connected, adds up the counter value of each user, and records the counter value and the user data in a memory in the apparatus manager Y (steps 304 to 306).

(3) On a predetermined close day that is once in a month, for example, the apparatus managers X and Y notify the central managing apparatus 4 of the integrated counter values of the respective users, which have been accumulated since the last close day. The central managing apparatus 4 obtains the counter values indicating the numbers of sheets used by the respective users, which are collected by the apparatus managers X and Y, and aggregates and stores them per user in the user counter 5. The counter values of the respective users are used for charging the users (steps 307 to 309).

FIG. 4 is a diagram showing an example of a price system of a maintenance service contract, for charging users in the embodiment of the present invention. A charging method of the present invention is described by using an example of such a contract type to determine a price per count according to a counter value and determine a maintenance price per month according to the price per count, as the maintenance service contract of the imaging apparatus. In the price system of the example shown in FIG. 4, when the number of used sheets in the imaging apparatus is 1 to 999, a price per sheet is 10 yen, when the number of used sheets is 1000 to 1999, a price per sheet is 8.5 yen, and when the number of used sheets is 2000 or more, a price per sheet is 7 yen. In the embodiment of the present invention below, a price system similar to FIG. 4 is used for the number of sheets used per user. Further, such data of the price system are managed in the central managing apparatus 4.

FIG. 5 is a diagram showing an example of the number of sheets that users M and N have used in the imaging apparatuses A and C shown in FIG. 1. Fees to be charged to these users in this case are described.

In the example shown in FIG. 5, the number of sheets used in the imaging apparatus A is 1100 and the number of sheets used in the imaging apparatus C is 2200. Therefore, according to the example of the price system shown in FIG. 4, prices per sheet are 8.5 yen in the imaging apparatus A and 7 yen in the imaging apparatus C.

According to the above results, fees to be charged to the respective users as to each of the imaging apparatuses A and C are obtained below.

FIG. 6 is a diagram showing fees to be charged to the respective users, as to the imaging apparatus A. FIG. 7 is a diagram showing fees to be charged to the respective users, as to the imaging apparatus C. The fees to be charged to the users M and N shown in FIGS. 6 and 7 can be obtained by the example of the price system shown in FIG. 4 and the numbers of sheets used by the respective users, which are shown in FIG. 5.

FIG. 8 is a diagram showing total fees to be charged to the respective users, which are obtained from the fees of each imaging apparatus and each user, which are obtained as shown in FIGS. 6 and 7. As shown in FIG. 8, the fee to be charged to the user M is 7650 yen while the fee to be charged to the user N is 17100 yen. Here, although the number of printed sheets by the user N is over 2000 sheets in total, a high fee is charged to the user N since the number of sheets printed by the user N by the imaging apparatus A is small.

When a price per sheet is determined by the number of printed sheets of each user according to the price system shown in FIG. 4, the price per sheet is 10 yen for the user M while the price per sheet is 7 yen for the user N. When fees to be charged to the respective users are obtained by multiplying the above prices per sheet with the total numbers of sheets printed by the respective users, the fee to be charged to the user M is 9000 yen and the fee to be charged to the user N is 16800 yen. If the user N had used only the imaging apparatus C, the fee would be only 16800 yen. However, since the user N used both the imaging apparatuses A and C, the user N is charged 17100 yen.

FIG. 9 is a diagram showing usage rates of the respective users, which are calculated by the charged fees of the respective users obtained by the total numbers of printed sheets of the respective users and the prices per sheet. As described above, the total number of printed sheets of each user is multiplied by the price per sheet according to the price system shown in FIG. 4 to obtain a value, which is used to calculate the usage rate of each user. As shown in FIG. 9, the usage rates of the users M and N are about 35% and about 65%, respectively.

In the embodiment of the present invention, these percentages are multiplied by the total fee of the imaging apparatuses A and C, so as to obtain fees to be charged to the users M and N.

FIG. 10 is a diagram showing the fees to be charged to the respective users, which are obtained by the percentages, that is the usage rates of the respective users and the total fee of the imaging apparatuses A and C shown in FIG. 8. As shown in FIG. 10, the fee to be charged to the user M is 8634 yen while the fee to be charged to the user N is 16116 yen. Thus, the advantage of the user N who has printed more sheets is reflected in the fee. On the other hand, when FIGS. 8 and 10 are compared, the fee to be charged to the user M is increased from 7650 yen to 8634 yen. However, as compared to the case where only the user M has used the imaging apparatus as shown in FIG. 9, the fee charged to the user M is relatively low since the number of sheets printed by the user N is large. Therefore, it is found that the fee charged to the user M is not unfairly increased.

Figure 11:
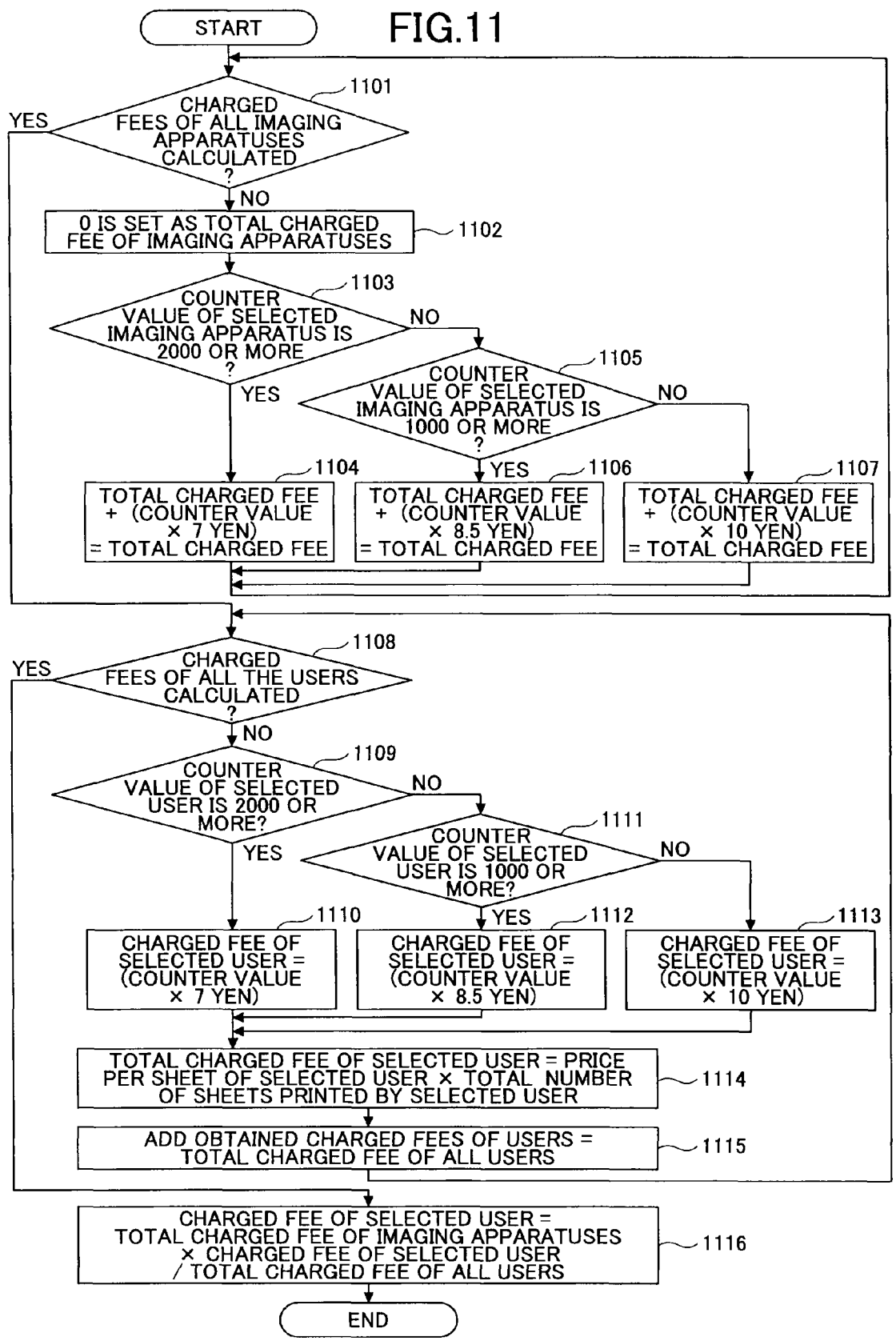
FIG. 11 is a flowchart for describing an operation of a process to calculate the fees to be charged to the respective users in an embodiment of the present invention.

FIG. 11 is a flowchart showing an operation of a process to calculate the fees to be charged to the respective users in the embodiment of the present invention. Now, this operation is described. The process here is performed by the central managing apparatus 4.

(1) When the process starts, it is determined whether calculations of fees to be charged of all the imaging apparatuses have ended, in order to obtain a total charged fee of the plural imaging apparatuses. When the calculations have not ended yet and a charged fee of an imaging apparatus selected as a first imaging apparatus is to be calculated, 0 yen is set as the total charged fee of all the imaging apparatuses (steps 1101 and 1102).

(2) It is determined whether a counter value of the first imaging apparatus is 2000 or more. When the counter value is 2000 or more, (counter value×7) is added to the total charged fee set in step 1102 to obtain a price, which is set as the total charged fee (steps 1103 and 1104).

(3) In the determination of step 1103, when the counter value of the first imaging apparatus is less than 2000, it is determined whether the counter value is 1000 or more. When the counter value is 1000 or more, (counter value×8.5) is added to the total charged fee set in step 1102 to obtain a price, which is set as the total charged fee (steps 1105 and 1106).

(4) In the determination of step 1105, when the counter value of the first imaging apparatus is less than 1000, (counter value×10) is added to the total charged fee set in step 1102 to obtain a price, which is set as the total charged fee (step 1107).

(5) After the process of step 1104, 1106, or 1107, the operation returns to the process of step 1101. Then, a charged fee of a second imaging apparatus is calculated. By summing the charged fees of all the imaging apparatuses in this manner, the total charged fee of the imaging apparatuses is calculated. Therefore, the total charged fee obtained by the process of the first imaging apparatus is set as a total charged fee in step 1102 in the process for the second imaging apparatus. By the above processes, the total charged fee is calculated by summing the charged fees of the respective imaging apparatuses, which is described with reference to FIG. 8.

(6) When the total charged fee of all the imaging apparatuses is calculated in the determination of step 1101, it is then determined whether charged fees of all the users have been calculated, in order to calculate charged fees of the respective users (step 1108).

(7) In the determination of step 1108, when the charged fees of all the users have not been calculated yet, it is determined whether a counter value of a selected user is 2000 or more. When the counter value is 2000 or more, (counter value×7) is calculated as a charged fee of the selected user (steps 1109 and 1110).

(8) In the determination of step 1109, when the counter value of the selected user is less than 2000, it is determined whether the counter value is 1000 or more. When the counter value is 1000 or more, (counter value×8.5) is calculated as a charged fee of the selected user (steps 1111 and 1112).

(9) In the determination of step 1111, when the counter value of the selected user is less than 1000, (counter value× 10) is calculated as a charged fee of the selected user (step 1113).

(10) In the processes of steps 1110, 1112, and 1113, the price per sheet according to the price system shown in FIG. 4 is multiplied by the counter values of the respective users, thereby the charged fees of the respective users are obtained. The charged fees obtained by the repeated processes are sequentially added to obtain a total charged fee of the users. Then, the operation returns to the process of step 1108. By these processes, the charged fees of the respective users according to the number of printed sheets, and the total charged fee of all the users are obtained (steps 1114 and 1115).

(11) In the determination of step 1108, when the calculations of the charged fees of all the users have ended, a ratio of the total charged fee of all the users obtained in steps 1114 and 1115 and the charged fee of each user according to the number of printed sheets is obtained. By this ratio, percentages indicating the usage rates of the imaging apparatuses of the respective users are calculated. The percentages are multiplied by the total charged fee obtained by summing the charged fees of the respective imaging apparatuses, thereby charged fees of the respective users are calculated. In this manner, the process here ends. By these processes, the charged fees of the respective users, which are described with reference to FIG. 10, are calculated (step 1116).

FIG. 12 is a diagram showing an example of the number of sheets that the users M and N printed by the imaging apparatuses A and B shown in FIG. 1. Now, another example of charging fees to the respective users in this case is described. In the example shown in FIG. 12, the number of sheets printed by the imaging apparatus A is 1100 while the number of sheets printed by the imaging apparatus B is 1500. Therefore, according to the example of the price system shown in FIG. 4, a price per sheet is 8.5 yen in both of the imaging apparatuses A an B.

According to the above price, charged fees of the respective users in the imaging apparatuses A and B are obtained below.

FIG. 13 is a diagram showing fees charged to the respective users in the imaging apparatus B. The fees charged to the users M and N in FIG. 13 can be obtained according to the example of the price system shown in FIG. 4 and the numbers of sheets printed by the respective users, which are shown in FIG. 12. The fees charged to the respective users in the imaging apparatus A are the same as those shown in FIG. 6, therefore, they are not shown in the drawing here.

FIG. 14 is a diagram showing total fees charged to the respective users, which are obtained by the charged fees of the respective imaging apparatuses and respective users, obtained as shown in FIGS. 6 and 13. As shown in FIG. 14, the fee charged to the user is 10200 yen while the fee charged to the user N is 11900 yen.

When the imaging apparatuses A and B are the same type of apparatuses, it is possible that a user uses both of the imaging apparatuses A and B connected in the same LAN. The price system, in which a price per sheet becomes lower when a user uses one of the imaging apparatuses especially frequently, is unfair for a user who uses the both imaging apparatuses of the same type.

In view of this, in this embodiment, charged fees of the respective users can be determined by the total number of printed sheets of the plural imaging apparatuses in the same LAN. In this case, the apparatus manager obtains the total number of printed sheets of the plural imaging apparatuses in the LAN to which the apparatus manager is connected and sends the total number to the central managing apparatus.

FIG. 15 is a diagram showing an example of the case to determine the charged fees of the respective users by the total number of sheets printed by the imaging apparatuses A and B. In the example shown in FIG. 15, the charged fees of the respective users are determined by the total number of sheets printed by the plural imaging apparatuses so that the users are satisfied with the charged fees. As shown in FIG. 15, a price per sheet becomes as low as 7 yen when calculated by the total number of printed sheets of the imaging apparatuses A and B, since the number of printed sheets becomes larger. In this case, the user is charged the same fee regardless of the percentages that the user has used different imaging apparatuses.

When the examples shown in FIGS. 14 and 15 are compared, the total fee to be charged to the users becomes less for a maintenance service provider in the example shown in FIG. 15. However, there are advantages in that a concentration of a frequency to use one of the imaging apparatuses A and B can be reduced, by which wear and tear of the imaging apparatus can be slowed, and that a frequency to send a CE (Customer Engineer) can be reduced.

The above-described processes of the embodiment of the present invention can be configured as a program to be executed by the CPU. Moreover, the program can be recorded in a recording medium such as an FD (Floppy Disk), a CD-ROM, and a DVD (Digital Versatile Disc) to be provided, or provided as digital data through a network.

According to one embodiment, when determining a fee to be charged to each user in an environment where the same user uses plural imaging apparatuses, the number of prints per user and the number of prints per imaging apparatus are both taken into account by using a user counter.

This patent application is based on Japanese Priority Patent Application No. 2008-068431 filed on Mar. 17, 2008, the entire contents of which are hereby incorporated herein by reference.

What is claimed is:

1. A remote management system, comprising:
    a plurality of imaging apparatuses; and
    a central managing apparatus configured to manage the plurality of imaging apparatuses, wherein the plurality of imaging apparatuses and the central managing apparatus are connected to mutually communicate with each other, wherein
    each of the plurality of imaging apparatuses notifies the central managing apparatus of one or more counter values of one or more users, one of said counter values corresponding to a number of images processed by a corresponding one of said users at one of the plurality of imaging apparatuses, and
    the central managing apparatus stores data associating a counter value with a price per count, obtains, according to the stored data, a price per count of one of said users based on a total counter value, said total counter value being a sum of said counter values for said one of said users notified by the plurality of imaging apparatuses, obtains a price per count of one of the plurality of imaging apparatuses, based on a total counter value of said one of the imaging apparatuses, according to the stored data, and determines a fee to be charged to said one of the users according to the price per count of said one of the plurality of imaging apparatuses, the price per count of said one of said users, and said total counter value of said one of said users.

2. The remote management system as claimed in claim 1, wherein the plurality of imaging apparatuses are connected to the central managing apparatus via an apparatus manager.

3. The remote management system as claimed in claim 2, wherein the apparatus manager sums said counter values of said users of the plurality of imaging apparatuses to obtain a total counter value of all of said users and notifies the central managing apparatus of the total counter value of all of said users, by managing the plurality of imaging apparatuses in a manner that is the same as a manner in which a single imaging apparatus is managed.

4. A remote management method to remotely manage plural imaging apparatuses, which are connected to a central managing apparatus that manages the plural imaging apparatuses, to communicate with the central managing apparatus, comprising:

notifying the central managing apparatus of one or more counter values of one or more users by the respective imaging apparatuses, one of said counter values corresponding to a number of images processed by one of said users at one of the plural imaging apparatuses, storing data associating a counter value with a price per count;

obtaining, according to the stored data, a price per count of one of said users based on a total counter value, said total counter value being a sum of said counter values for said one of said users notified by the plural imaging apparatuses;

obtaining, by the central managing apparatus, a price per count of one of the plurality of imaging apparatuses, based on a total counter value of said one of the imaging apparatuses., according to the stored data; and determining a fee to be charged to said one of said users by the central managing apparatus according to the price per count of said one of the plurality of imaging apparatuses, the price per count of said one of said users, and said total counter value of said one of said users.

5. The remote management method as claimed in claim 4, wherein the obtaining includes, obtaining a price per count of one of the plural imaging apparatuses, based on a total counter value of said one of the plural imaging apparatuses, according to the stored data, and the determining the fee includes determining the fee to be charged to said one of said users according to the price per count of said one of the plural imaging apparatuses, the price per count of said one of said users, and said total counter value of said one of said users.

6. The remote management method as claimed in claim 5, wherein the plural imaging apparatuses are connected to the central managing apparatus via an apparatus manager.

7. The remote management method as claimed in claim 6, wherein the apparatus manager sums said counter values of said users of the plurality of imaging apparatuses to obtain a total counter value of all of said users and notifies the central managing apparatus of the total counter value of all of said users, by managing the plurality of imaging apparatuses in a manner that is the same as a manner in which a single imaging apparatus is managed.

8. The remote management system according to claim 1, wherein the central managing apparatus determines a total apparatus fee to be charged, for each of the plurality of imaging apparatuses, based on the total counter value of said one of the plurality of imaging apparatuses and the price per count of said one of the plurality of imaging apparatuses;

determines an initial user charge based on the price per count of said one of said users and said total counter value of said one of said users;

determines a total user fee for all of said users by summing initial user charges determined for each of said users; and determines the fee to be charged to said one of said users further based on multiplying the total apparatus fee by the initial user charge and dividing by the total user fee for all of said users.

9. The remote management method according to claim 5, further comprising:

determining a total apparatus fee to be charged, for each of the plural imaging apparatuses, based on the total counter value of said one of the plural imaging apparatuses and the price per count of said one of the plural imaging apparatuses;

determining an initial user charge based on the price per count of said one of said users and said total counter value of said one of said users;

determining a total user fee for all of said users by summing initial user charges determined for each of said users; and determining the fee to be charged to said one of said users further based on multiplying the total apparatus fee by the initial user charge and dividing by the total user fee for all of said users.

10. The remote management system according to claim 1, wherein the total counter value is based on at least two counter values for said one of said users.

11. The remote management system according to claim 1, wherein each of at least two of the plurality of imaging apparatuses notify the central managing apparatus of a non-zero counter value for said one of said users.

12. The remote management system according to claim 1, wherein the plurality of imaging apparatuses includes different types of image forming apparatuses.

13. The remote management system according to claim 12, wherein the different types of image forming apparatuses include at least two of photocopying, printing, facsimile, and multifunction peripheral apparatuses.

14. The remote management system according to claim 1, wherein a fee determined based on a counter value, for said one of said users, notified by one of the plurality of imaging apparatuses is different from the fee to be charged to said one of said users determined based on said total counter value.

* * * * *